US008156323B1

(12) United States Patent
Shnowske et al.

(10) Patent No.: US 8,156,323 B1
(45) Date of Patent: *Apr. 10, 2012

(54) SECURED ONLINE FINANCIAL TRANSACTION VOICE CHAT

(75) Inventors: Daniel P. Shnowske, Waxahachie, TX (US); William Treadwell, Addison, TX (US)

(73) Assignee: Bank of America Corporation, Charlotte, NC (US)

( * ) Notice: Subject to any disclaimer, the term of this patent is extended or adjusted under 35 U.S.C. 154(b) by 541 days.

This patent is subject to a terminal disclaimer.

(21) Appl. No.: 12/345,328

(22) Filed: Dec. 29, 2008

(51) Int. Cl.
*H04L 29/06* (2006.01)

(52) U.S. Cl. .......... 713/151; 713/709; 709/206; 726/29; 705/35; 463/36; 463/42

(58) Field of Classification Search .................. 713/151, 713/166; 726/29; 463/36, 42
See application file for complete search history.

(56) References Cited

U.S. PATENT DOCUMENTS

| | | | |
|---|---|---|---|
| 7,090,582 B2 * | 8/2006 | Danieli et al. ............. | 463/35 |
| 7,452,278 B2 * | 11/2008 | Chen et al. ............... | 463/42 |
| 7,464,272 B2 * | 12/2008 | Danieli ..................... | 713/182 |
| 7,694,139 B2 * | 4/2010 | Nachenberg et al. ....... | 713/170 |
| 7,802,110 B2 * | 9/2010 | Morais ..................... | 713/193 |
| 7,861,176 B2 * | 12/2010 | Weisberg ................. | 715/758 |
| 7,882,243 B2 * | 2/2011 | Ivory et al. ............... | 709/227 |
| 2004/0083366 A1 * | 4/2004 | Nachenberg et al. ...... | 713/170 |
| 2004/0123109 A1 * | 6/2004 | Choi ........................ | 713/176 |
| 2004/0224771 A1 * | 11/2004 | Chen et al. ............... | 463/42 |
| 2005/0071481 A1 * | 3/2005 | Danieli .................... | 709/229 |
| 2005/0113169 A1 * | 5/2005 | Danieli et al. ........... | 463/36 |
| 2005/0245317 A1 * | 11/2005 | Arthur et al. ............. | 463/42 |
| 2006/0047958 A1 * | 3/2006 | Morais .................... | 713/166 |
| 2006/0229129 A1 * | 10/2006 | Jalava et al. ............. | 463/41 |
| 2006/0287105 A1 * | 12/2006 | Willis ...................... | 463/42 |
| 2007/0004518 A1 * | 1/2007 | Friesen et al. ........... | 463/42 |
| 2007/0087819 A1 * | 4/2007 | Van Luchene et al. ... | 463/25 |
| 2007/0245249 A1 * | 10/2007 | Weisberg ................ | 715/758 |
| 2007/0271618 A1 * | 11/2007 | Chao et al. .............. | 726/27 |
| 2008/0031458 A1 * | 2/2008 | Raja ........................ | 380/279 |
| 2008/0040419 A1 * | 2/2008 | Muth ....................... | 709/203 |
| 2008/0072054 A1 * | 3/2008 | Choi ........................ | 713/176 |
| 2008/0103920 A1 * | 5/2008 | Leach et al. ............. | 705/26 |
| 2008/0104402 A1 * | 5/2008 | Gueron et al. ........... | 713/176 |
| 2008/0108426 A1 * | 5/2008 | Nguyen et al. ........... | 463/25 |
| 2009/0064038 A1 * | 3/2009 | Fleischman et al. ..... | 715/810 |
| 2009/0132812 A1 * | 5/2009 | Kobozev et al. ......... | 713/156 |
| 2009/0182664 A1 * | 7/2009 | Trombley ................ | 705/42 |
| 2009/0228704 A1 * | 9/2009 | de Atley et al. ......... | 713/156 |
| 2009/0235312 A1 * | 9/2009 | Morad et al. ............. | 725/44 |

(Continued)

FOREIGN PATENT DOCUMENTS

EP 813175 A2 * 12/1997

*Primary Examiner* — April Shan
(74) *Attorney, Agent, or Firm* — Moore & Van Allen PLLC; James C. Edwards

(57) ABSTRACT

Systems, methods, and computer program products are defined that provide for secure online financial transaction voice chat. According to present embodiments, the security provided to the voice chat stream is less likely to be intercepted by a network attacker during communication. In addition to providing heightened security to voice chat transmissions, methods, systems and computer program products provide for an alternate platform for delivering the voice chat application in the form of a game console. In this regard, the methods, systems and the like provide for voice chat/calls on platforms other than personal computers, laptops and/or telephones.

14 Claims, 9 Drawing Sheets

U.S. PATENT DOCUMENTS

| | | | |
|---|---|---|---|
| 2009/0249074 A1* | 10/2009 | Madhavan et al. | 713/176 |
| 2009/0259753 A1* | 10/2009 | Hinton et al. | 709/226 |
| 2009/0264070 A1* | 10/2009 | Lim | 455/41.2 |
| 2009/0276529 A1* | 11/2009 | Ivory et al. | 709/227 |
| 2010/0031042 A1* | 2/2010 | Di Crescenzo et al. | 713/169 |
| 2010/0069892 A1* | 3/2010 | Steinbach et al. | 604/891.1 |
| 2010/0070758 A1* | 3/2010 | Low et al. | 713/155 |
| 2010/0121761 A1* | 5/2010 | Allen et al. | 705/38 |
| 2010/0169202 A1* | 7/2010 | Shnowske et al. | 705/35 |
| 2010/0268771 A1* | 10/2010 | Kulakowski et al. | 709/203 |
| 2010/0299731 A1* | 11/2010 | Atkinson | 726/6 |

* cited by examiner

SECURED ONLINE FINANCIAL TRANSACTION VOICE CHAT

FIELD

In general, embodiments herein disclosed relate to systems, methods, and computer program products for providing secured online financial transaction voice chat via a game console or other device limited to executing signed code.

BACKGROUND

Currently, online and mobile banking provide financial institution customers the ability to make payments, transfer funds and the like via personal computers or other computing devices capable of connecting with the Internet. However, the security of such web-based transactions is at risk because the financial institution has no way to ensure the integrity and confidentiality of these transactions. This is due to the fact that the financial institutions have no means to ensure that the customer's device or system provides the necessary degree of security, irrespective of the customer being an individual customer or a business customer.

Specifically, personal computers are inherently not designed to provide the highest possible level of security. This is because the user of the personal computer demands the freedom to be able to execute any type of software, firmware or the like regardless of the security protection provided to the software. In this regard, personal computers are configured to allow for executing both secure software and unsecure software.

In addition, the ancillary applications provided for by online financial services delivered via conventional platforms, such as voice chat applications delivered via a personal computer, do not provide for a high level of security. Such applications generally employ Voice Over IP (VOIP) to communicate the voice stream through a conventional channel, such as a Public Switch Telephone Network (PSTN) channel or the like. These conventional channels lack the necessary security measures to ensure that the voice chat dialog does not get intercepted by a network attacker or otherwise diverted.

In other instances, the user/customer may not have access to conventional communication platforms, such as personal computers, laptops and/or telephones to be able to conduct a voice call with a financial institution representative. In such instances, the customer may desire an alternate platform that provides the ability to conduct voice calls.

Therefore, a need exists to develop methods, systems, computer program products and the like which provide for voice communication between the user of a financial service application and a representative of the financial institution, such that the voice stream is less likely to be intercepted by a network attacker during communication. In addition to providing heightened security to voice chat transmissions, desired methods should provide for an alternate platform for delivering the voice chat application. In this regard, the desired methods, systems and the like should provide for voice chat/calls on platforms other than personal computers, laptops and/or telephones.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems and computer program products are defined that provide for secure online financial transaction voice chat. According to present embodiments, the security provided to the voice chat stream is less likely to be intercepted by a network attacker during communication. In addition to providing heightened security to voice chat transmissions, methods, systems and computer program products provide for an alternate platform for delivering the voice chat application in the form of a game console. In this regard, the methods, systems and the like provide for voice chat/calls on platforms other than personal computers, laptops and/or telephones.

According to one embodiment of the present invention, a method for providing voice chats for a game console-based online financial institution service is provided. The method includes executing, on a game console device, an online financial institution service application and receiving a user request to initiate a voice chat session via the online financial institution service. The method additionally includes establishing a secure network connection between the game console device and a network entity associated with the financial institution and accessing, on behalf of the voice chat session, a microphone associated with the gaming console and a speaker associated with the game console. The method also includes receiving, at the microphone, user voice inputs for the voice chat session and communicating the user voice inputs via the secure network connection to a network entity associated with the financial institution.

According to specific embodiments of the method, executing an online financial institution service application may further include executing an online financial institution service application that includes signed code. In such embodiments, the game console device may be further defined as being configured to execute only signed code.

In other embodiments of the method, establishing the secure network connection includes establishing a Secured Socket Layer (SSL) protocol, a Transport Layer Security (TLS) protocol network connection network connection or any other suitable secure network connection. Additionally, in other embodiments, establishing the secure network connection may also include exchanging digital certificates between the online financial institution service application and a network entity associated with the financial institution and/or communicating a game console identifier to the network entity associated with the financial institution.

A system for providing voice chats for a game console-based online financial institution service defines another embodiment of the present invention. The system includes a gaming console device including a computing platform having at least one processor and a memory in communication with the processor. The system additionally includes an online financial customer service application operable to be loaded into the memory of the gaming console device and executed on the gaming console. The application is specifically configured for the gaming console. The application includes a voice chat module operable to send and voice chat streams via a secure network connection between the gaming console and a network entity associated with the financial institution.

In specific embodiments of the system, the voice chat module may be operable to establish the secure network connection between the game console device and the network entity associated with the financial institution. In such embodiments, the online financial institution application may be further operable to exchange certificates between the application and a network entity associated with the financial institution to establish the secure network connection.

In other embodiments, the system may include a microphone associated with the gaming console device and a speaker associated with the gaming console device. In such embodiments, the voice chat module may be further operable to gain access to the microphone and the speaker to conduct a voice chat session.

In certain embodiments of the system, the online financial customer service application includes signed code. In such embodiments of the system, the gaming console device may further be defined as configured to execute only signed code.

In further alternate embodiments of the system, the voice chat module may be further operable to receive and send voice chat streams via a Secured Socket Layer (SSL) protocol network connection, a Transport Layer Security (TLS) protocol network connection or any other suitable security protocol network connection.

A computer program product provides for yet another embodiment of the present invention. The computer program product includes a computer-readable medium. The medium includes a first set of codes for causing a game console to execute an online financial institution service application and a second set of codes for causing the game console to receive a user request to initiate a voice chat session via the online financial institution service. The medium additionally includes a third set of codes for causing the game console to establish a secure network connection between the game console device and a network entity associated with the financial institution, and a fourth set of codes for causing the game console to access, on behalf of the voice chat session, a microphone associated with the gaming console and a speaker associated with the game console. Also, the medium includes a fifth set of codes for causing the game console to receive, at the microphone, user voice inputs for the voice chat session and a sixth set of codes for causing the game console to communicate the user voice inputs via the secure network connection to a network entity associated with the financial institution.

In one specific embodiment of the computer program product, the first set of codes may further cause the gaming console to execute an online financial institution service application that includes signed code. In such embodiments, the game console device may be further defined as being configured to execute only signed code.

In other embodiments of the computer program product, the third set of codes may further cause the game console to establish a Secured Socket Layer (SSL) protocol network connection, a Transport Layer Security (TLS) protocol network connection or any other suitable security protocol network connection. Additionally, in other embodiments of the computer program product, the third set of codes may cause the game console to exchange digital certificates between the online financial institution service application and a network entity associated with the financial institution and/or communicate a game console identifier to the network entity associated with the financial institution.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
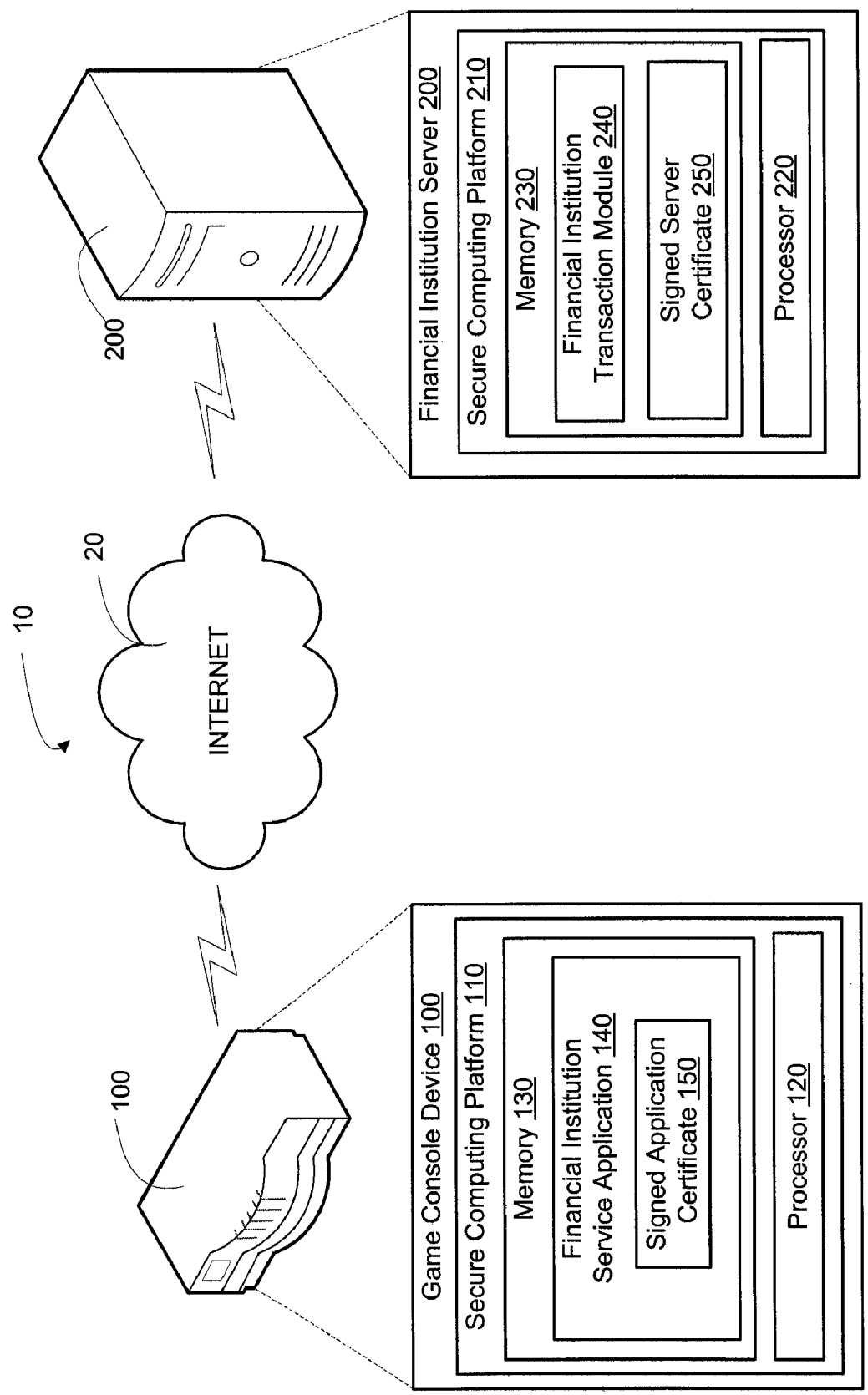
Figure 2:
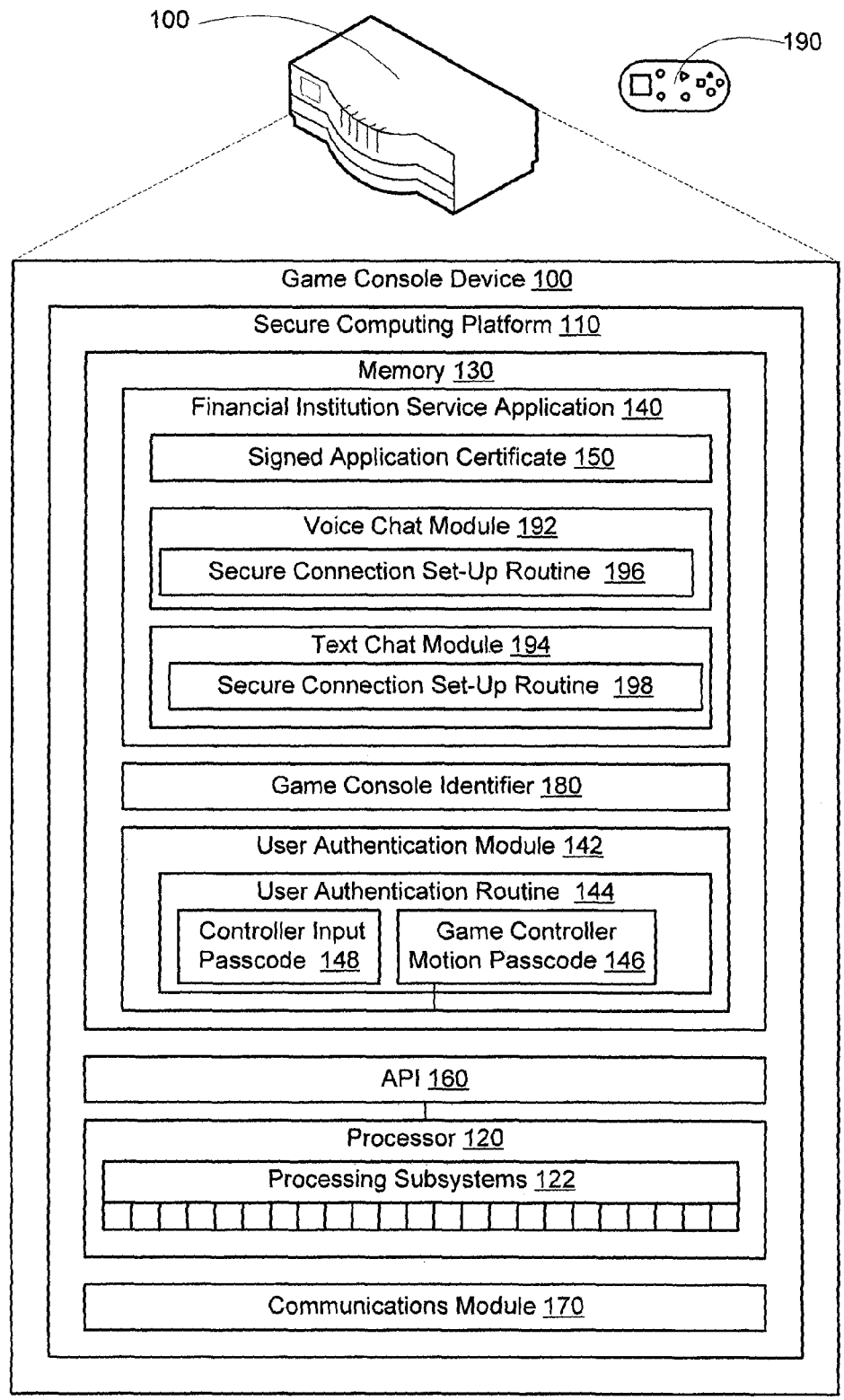
Figure 3:
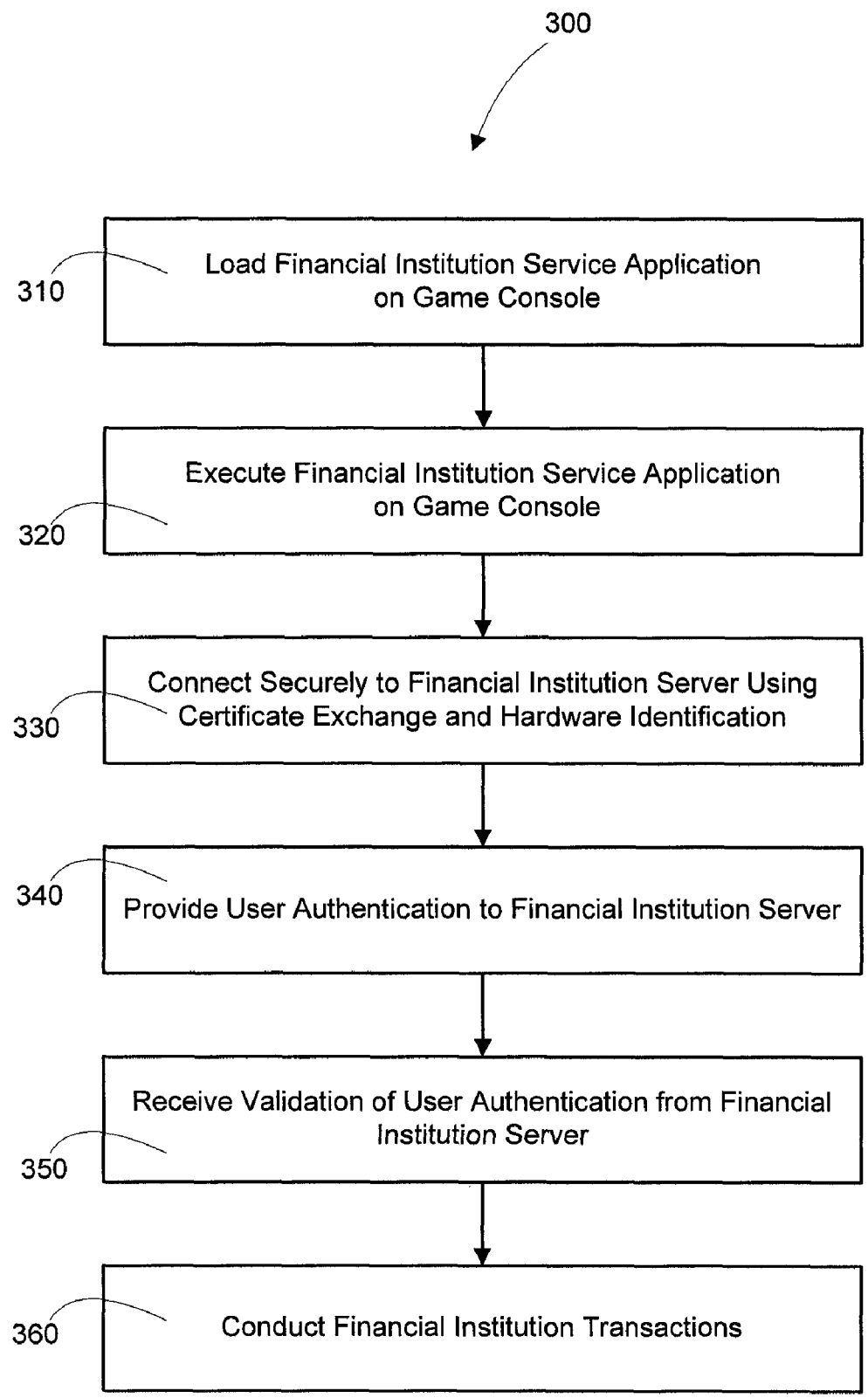
Figure 4:
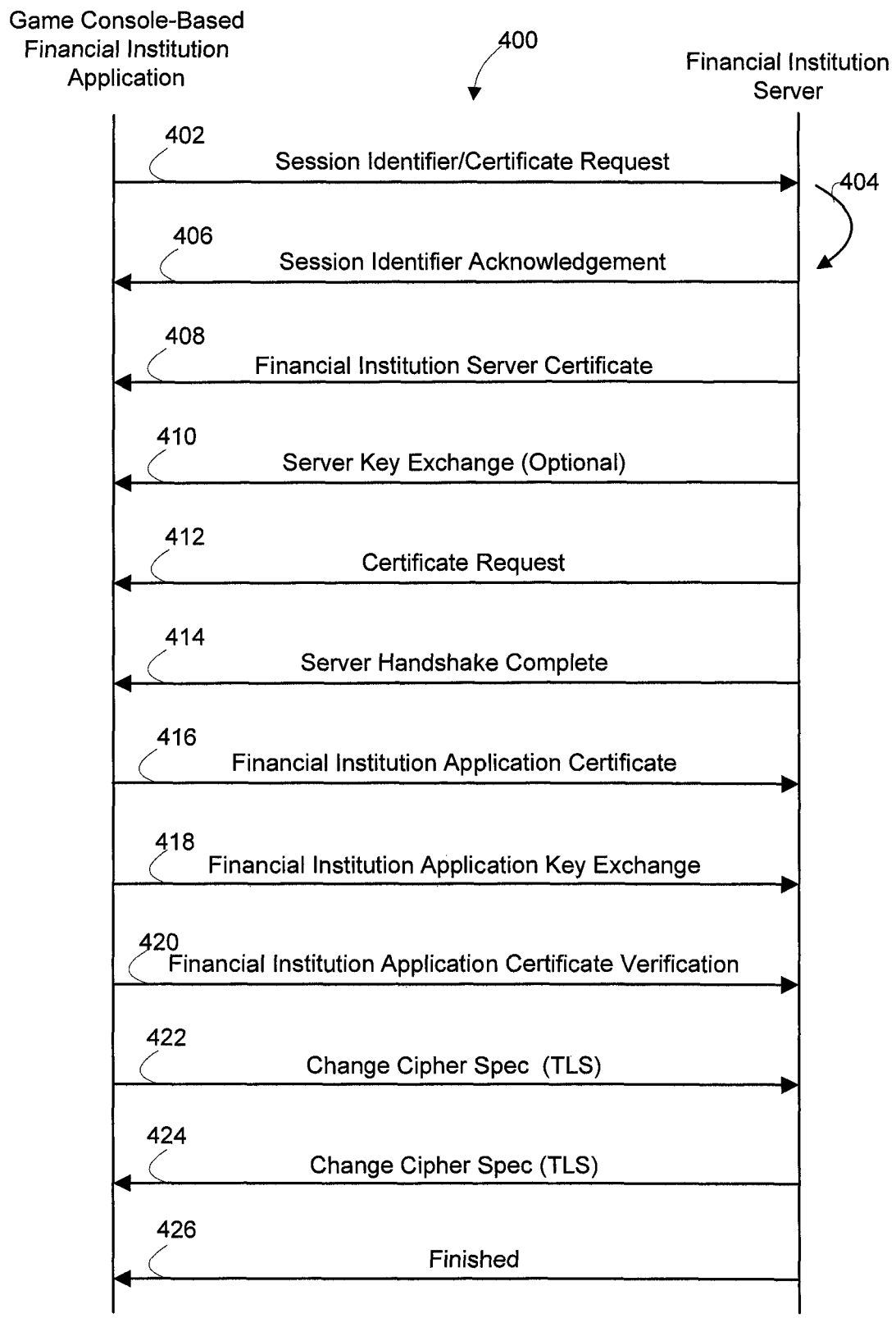
Figure 5:
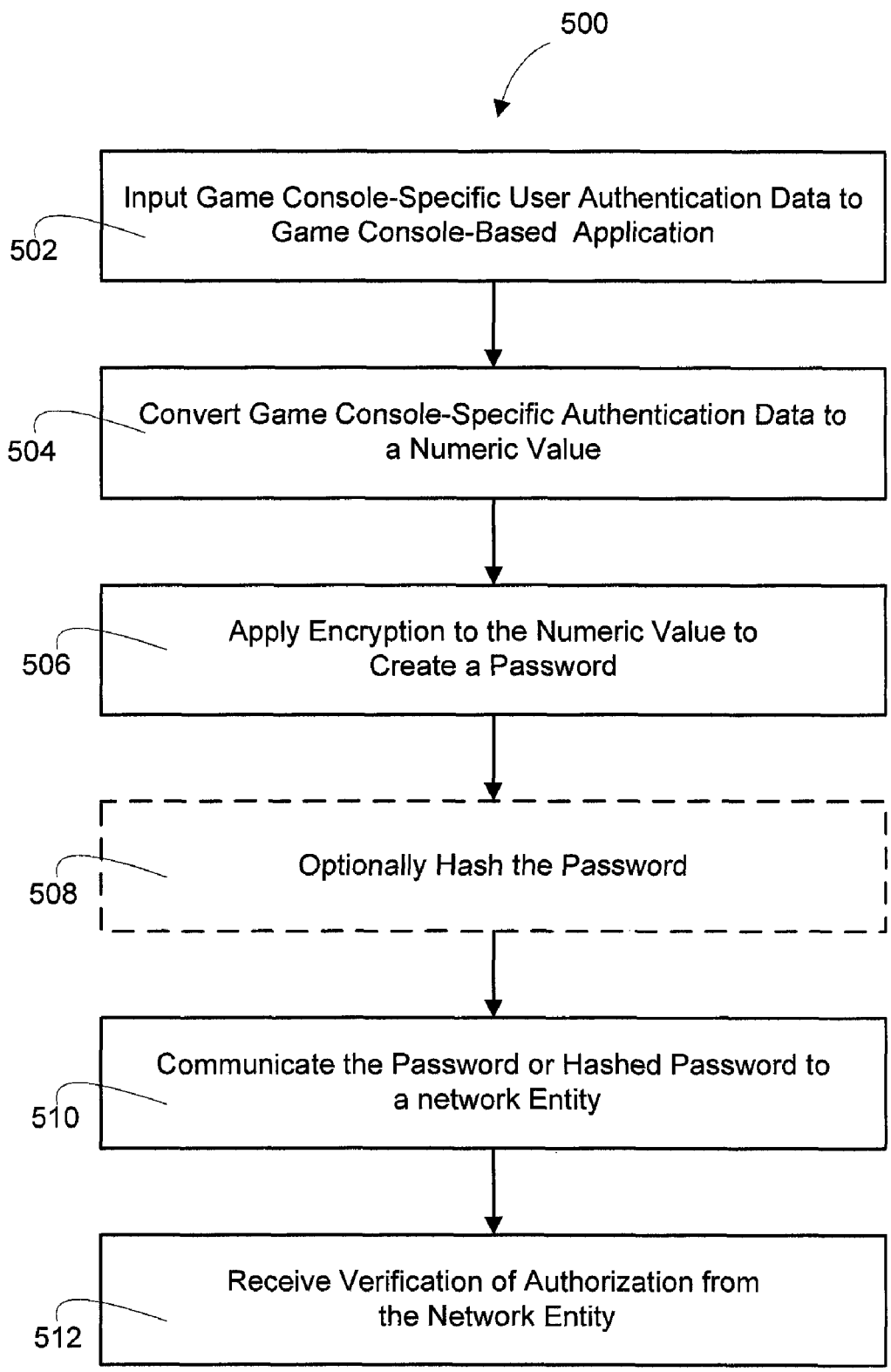
Figure 6A:
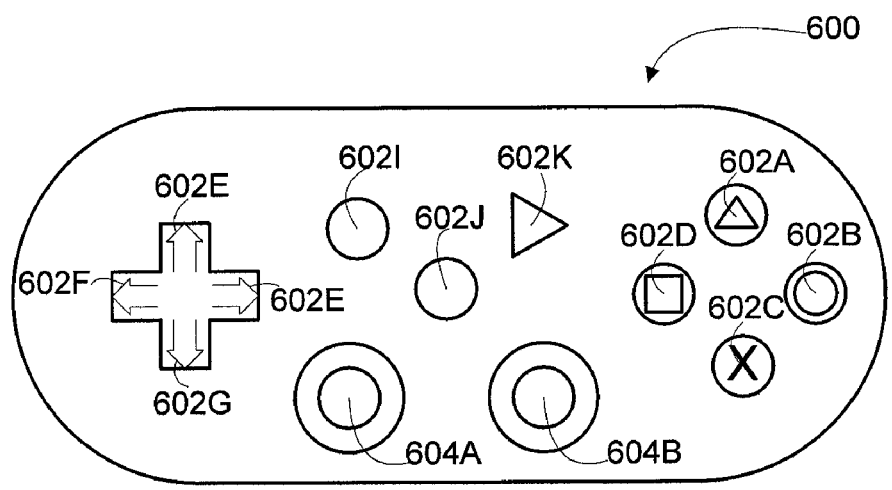
Figure 6B:
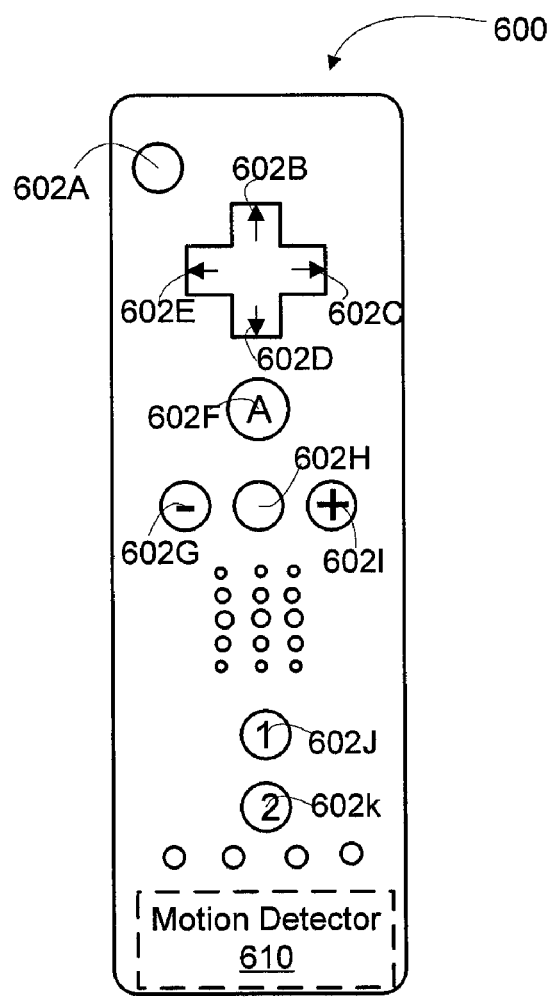
Figure 7:
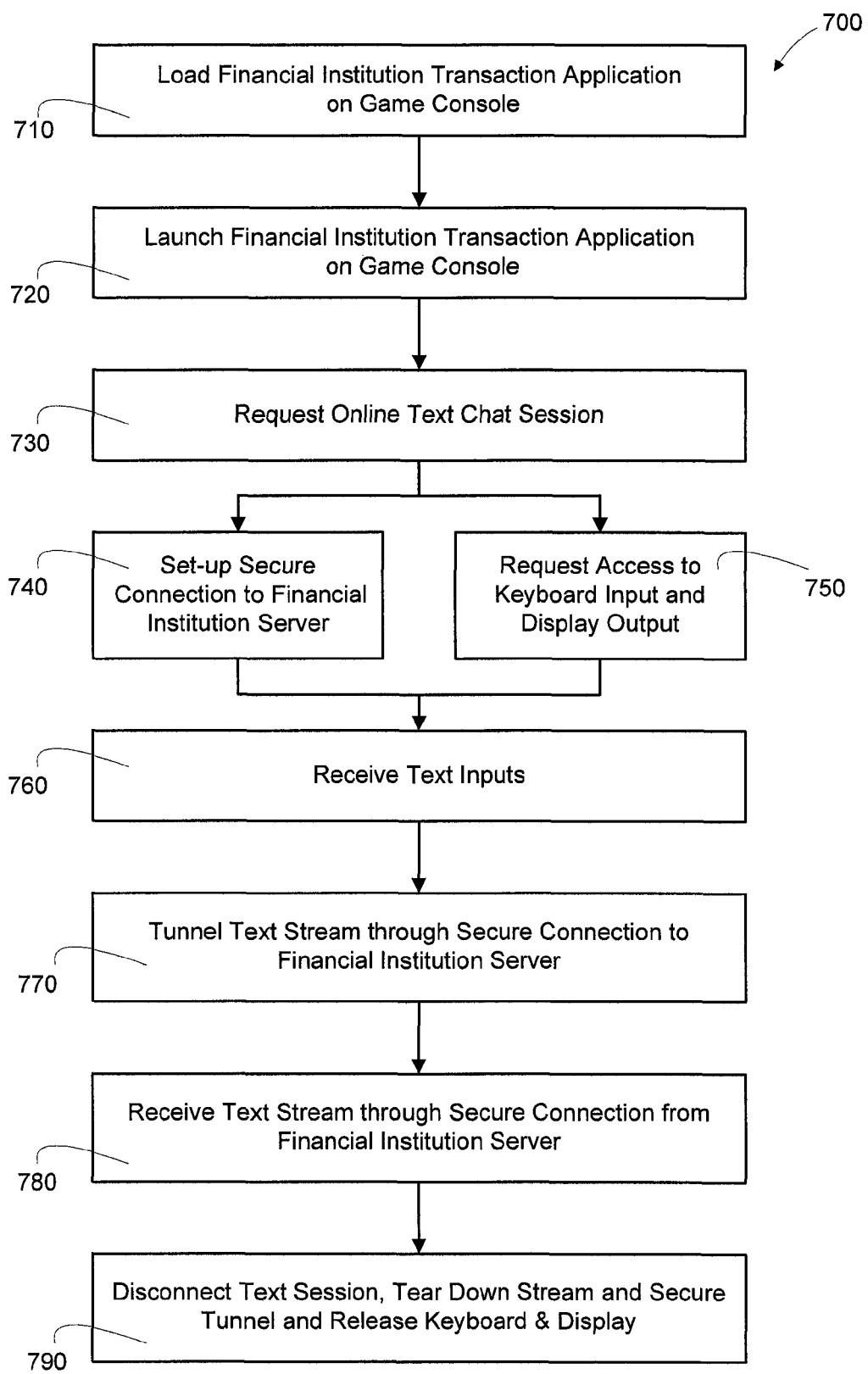
Figure 8:
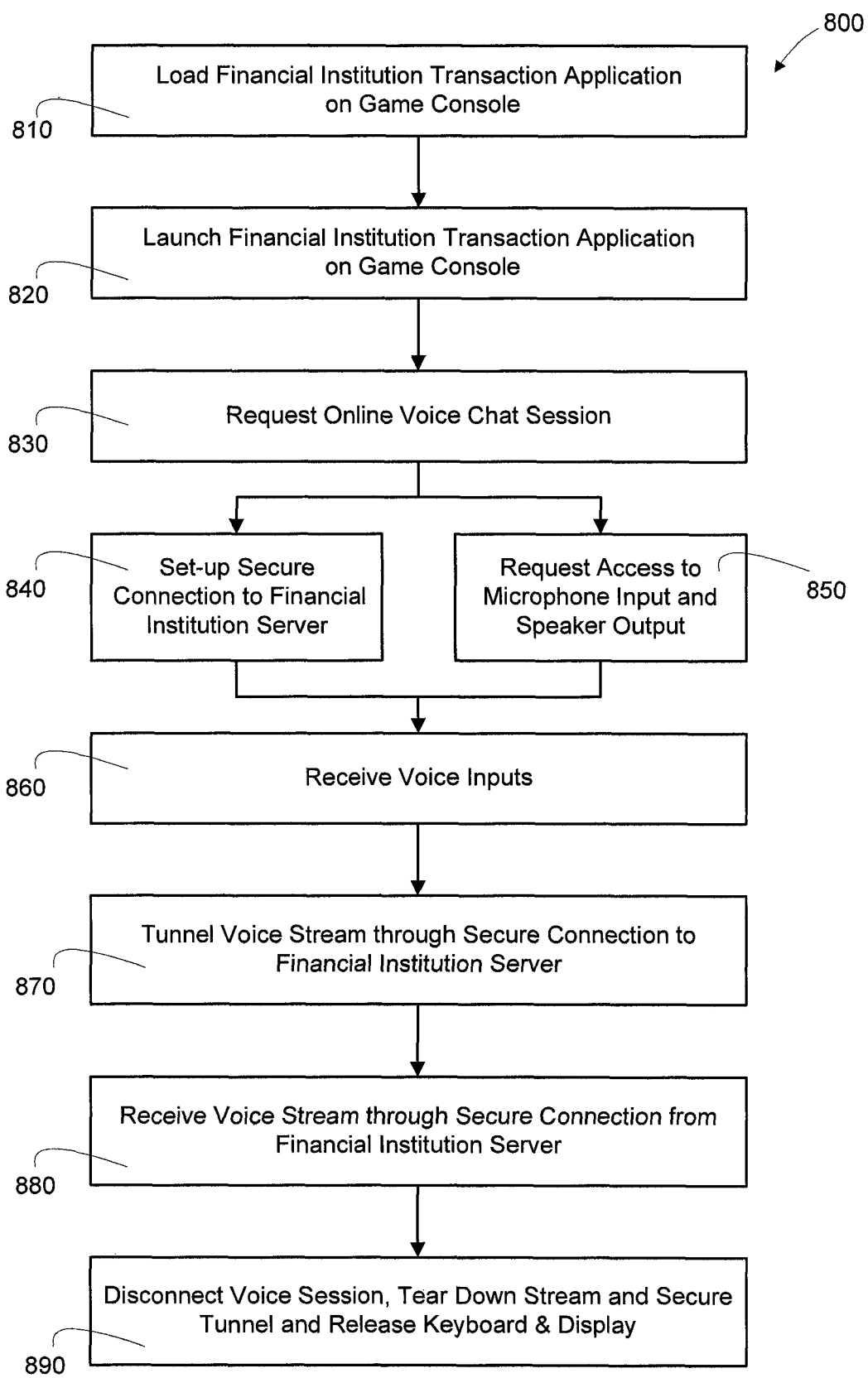
Figure 9:
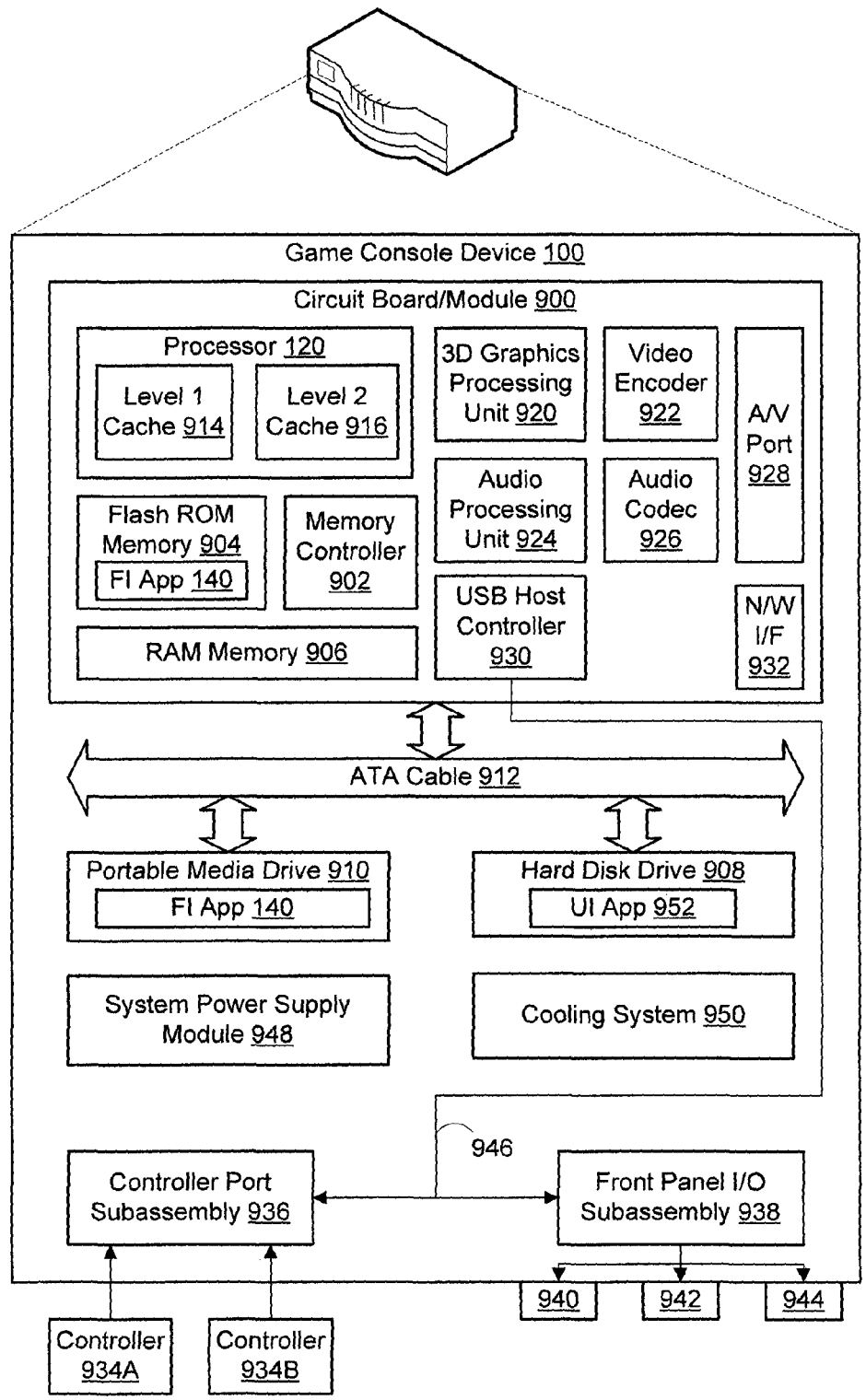

Having thus described embodiments of the invention in general terms, reference will now be made to the accompanying drawings, which are not necessarily drawn to scale, and wherein:

FIG. 1 is a block diagram of a system for providing financial institution services via a gaming console platform, in accordance with one embodiment of the present invention;

FIG. 2 is a detailed block diagram of a gaming console device configured to provide financial institution services, in accordance with one embodiment of the present invention;

FIG. 3 is a flow diagram of a method for providing financial institution services via a gaming console platform, in accordance with an embodiment of the present invention;

FIG. 4 is a message or call flow diagram illustrating exemplary messages sent between a financial institution service application and a financial institution server during bi-directional exchange of signed digital certificates, in accordance with one embodiment of the present invention;

FIG. 5 is a flow diagram of a method for user authentication in a game console-based financial institution service application, according to another embodiment of the present invention;

FIGS. 6A and 6B provide illustrations of game controllers used as game console-specific input devices for defining user authentication mechanisms/passcodes, according to another embodiment of the present invention;

FIG. 7 is a flow diagram of a method for providing text chat sessions within a game console-based financial institution service application, according to another embodiment of the present invention;

FIG. 8 is a flow diagram of a method for providing voice chat sessions within a game console-based financial institution service application, according to another embodiment of the present invention; and FIG. 9 depicts a block diagram overview of the architecture of a generic gaming console device, according to a further embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media, including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for a secure platform for financial transactions. In accordance with an embodiment of the present invention, a game console device is implemented as the platform for conducting financial transactions. The game console device is characteristically defined as executing only signed code and, therefore, the financial institution service application that is executed on the gaming console device includes signed code and a corresponding digital certificate. In this regard, the gaming console provides far greater security than a conventional platform, such as a personal computer (PC) or the like, which allows for both signed code and unsigned code to be executed on the device, thereby compromising the security of the device and the financial transactions conducted on the device.

In addition to providing heightened security, the gaming console platform affords the financial institution and/or financial institution service providers the ability to configure an application specifically suited for the capabilities of the gaming platform. In this regard, an enhanced user experience may be provided. For example, the financial institution and/or service provider may configure the application to utilize various input mechanisms, such as game controllers or the like, which have input functionality beyond a conventional mouse/pointer type input mechanism.

In further embodiments of the present invention, a user authentication method is herein described that relies on user inputs to gaming console-specific input mechanisms to define the user's authentication passcode. In this regard, the passcode that is implemented by the user is one other than a conventional alpha-numeric password. Hence, additional security is provided to the user authentication process by having an authentication passcode that is not easily intercepted or replicated. An additional benefit is foreseen in that the user authentication mechanisms herein disclosed are more apt to be remembered by the user.

In still further embodiments of the present invention, secure voice chat sessions and text chat sessions used in conjunction with gaming console-based financial institution services are herein described. The voice chat sessions and text sessions implement secure protocols, such as Secure Socket Layer (SSL), Transport Layer Security (TLS) or the like, to tunnel text or voice streams between the gaming console and the financial institution.

Referring to FIG. 1 a block diagram is depicted of a system 10 for providing financial institution services via a gaming console device platform. The system 10 includes a game console device 100 and financial institution server 200 that are in network communication. Examples of gaming console device 100 include, but are not limited to, Playstation®, PlayStation Portable (PSP®) manufactured by Sony Corporation of Tokyo, Japan; Xbox® manufactured by Microsoft Corporation of Redmond, Wash., USA; and Wii®, GameBoy® and Nintendo DS™ manufactured by Nintendo Company Ltd. of Kyoto, Japan. In the illustrated example of FIG. 1, the game console device 100 and the financial institution server 200 are in network communication via the Internet 20, although other public and/or private intranets may also be implemented in accordance with other embodiments of the present invention.

The game console device 100 includes secure computing platform 110 having a processor 120 and a memory 130. As previously noted, the secure nature of computing platform 110 dictates that the applications, modules, routines and the like that are executed on the gaming console include signed code. Signed code ensures the integrity of the code and allows the system to recognize updated versions of the code as the same program as the original. Thus, once code is signed, any change in the code that was not intended, whether introduced accidently or by attackers (otherwise referred to herein as hackers) can be detected by the system. A code signature includes a unique identifier, which can be used to identify the code or to determine to which groups or categories the code belongs; a seal, which is a collection of checksums or hashes of the various parts of the program; and a digital signature, which signs the seal to guarantee the integrity and includes information that can be used to determine who signed the code and whether the signature is valid.

Further, the memory 130 of secure computing platform 110 includes financial institution service application 140. The financial institution service application 140 is operable for establishing a secure connection with the financial institution server 200 to deliver financial services to the user of the game console device 100. Financial services may include, but are not limited to, online banking, bill pay services, investment transaction services, transfers between accounts, account balance services and the like. In addition, from the business perspective, the game console device 100 may be in communication with a digital cash drawer, card/UPC scanner, or the like (which are not depicted in FIG. 1) and, thus, the gaming console may function as a point-of-sale device. The financial institution service application 140 includes signed code and is specifically configured for the gaming console platform on which it is implemented. Thus, financial institution service application 140 includes a signed application certificate 150. The signed application certificate 150 serves to establish identity by associating a public key to the application, assign authority by establishing what actions the application may take based upon the certificate, and secure confidential information. In general, a digital certificate may include a public key, a name, an expiration date, the name of the issuing authority, a serial number, and any relevant policies describing how the certificate may be used, the digital signature of the certificate issuer and any other pertinent information.

The financial institution server 200 also includes a secure computing platform 210 having a processor 220 and memory 230. Memory 230 includes a financial institution transaction module 240 operable for providing a secure connection to the game console device 100 and delivering financial institution services to the gaming console device 100. As a secure server, financial institution server 200 includes a signed server certificate 250. The signed server certificate 250 serves to establish identity by associating a public key to the server, assign authority by establishing what actions the server may take based upon the certificate, and secure confidential information, such as encrypting the financial transactions session's symmetric key for data confidentiality.

In practice, when the financial institution service application 140 makes a connection to the financial institution server 200, the financial institution service application 140 sends a session identifier to the financial institution server 200 and requests the server's signed server certificate 250. In response, financial institution server 200 sends the signed server certificate 250 and a request for the signed application certificate 150. The financial institution service application 140 responds by sending the signed application certificate 150 along with, where applicable, a secret key to be used with the secret key encryption scheme and a verification of the signed application certification. In this regard, the authentication that takes place is bi-directional; the financial institution server 200 authenticates the financial institution service application 140 and the game console device 100 authenticates the financial institution transaction module 240 and/or financial institution server 200. More explicit description of the messaging scheme for providing bi-directional authentication is provided for in FIG. 4 and the discussion related thereto.

Referring to FIG. 2, depicted is a more detailed block diagram of a gaming console device 100 configured to provide financial institution services, in accordance with present embodiments. In addition to providing greater detail, FIG. 2 highlights various alternate embodiments of the present invention. The gaming console device 100 may include any type of computerized communication device, capable of providing a platform for the financial institution service application 140 and establishing a secure network connection with the financial institution server 200 on behalf of the financial institution service application 140. As such, the gaming console device 100 may be configured to only execute code that is signed.

The gaming console device 100 includes secure computing platform 110 that can transmit data across a wired and/or wireless network, and that can receive and execute routines and applications. Secure computing platform 110 includes memory 130, which may comprise volatile and non-volatile memory such as read-only and/or random-access memory (RAM and ROM), EPROM, EEPROM, flash cards, or any memory common to computer platforms. Further, memory 130 may include one or more flash memory cells, or may be any secondary or tertiary storage device, such as magnetic media, optical media, tape, or soft or hard disk.

Further, secure computing platform 110 also includes processor 120, which may be an application-specific integrated circuit ("ASIC"), or other chipset, processor, logic circuit, or other data processing device. Processor 120 or another processor, such as an ASIC, may execute an application programming interface ("API") layer 160 that interfaces with any resident programs, such as financial institution service application 140 stored in the memory 130 of the gaming console device 100. API 160 is typically a runtime environment executing on the gaming console device 100 and operable to control the execution of applications on the gaming console device 100.

Processor 120 includes various processing subsystems 122 embodied in hardware, firmware, software, and combinations thereof, that enable the functionality of gaming console device 100 and the operability of the device on the wired or wireless network. For example, processing subsystems 122 allow for initiating and maintaining communications, and exchanging data, with other networked devices. For example, processor 120 may additionally include one or a combination of processing subsystems 122, such as: sound, non-volatile memory, file system, transmit, receive, searcher, layer 1, layer 2, layer 3, main control, remote procedure, digital signal processor, Bluetooth® system, Bluetooth®, user interface, security, authentication, graphics, USB, multimedia such as MPEG, GPRS, etc (all of which are not individually depicted in FIG. 2 for the sake of clarity).

Secure computing platform 110 additionally includes communications module 170 embodied in hardware, firmware, software, and combinations thereof, that enables communications among the various components of the gaming console device 100, as well as between the gaming console device 100 and the network. In described embodiments, the communications module 170 enables the communication of all correspondence between gaming console device 100 and other wired or wireless devices. Thus, communications module 170 may include the requisite hardware, firmware, software and/or combinations thereof for establishing a wired or wireless network communication connection.

As previously noted in regards to FIG. 1, the memory 130 of secure computing platform 110 includes financial institution service application 140. The financial institution service application 140 is operable for establishing a secure connection with the financial institution server 200 to deliver financial services to the user of the gaming console device 100. The financial institution service application 140 is configured with signed code and is specifically configured for the gaming console platform on which it is implemented. Thus, financial institution service application 140 includes a signed application certificate 150. Bi-directional application and financial institution server authentication are conducted by exchanging the digital certificates between the application and the financial institution server. In addition to exchange of the digital certificates, further authentication of the gaming console device 100 is provided by communicating a game console identifier 180 that is stored in memory 130 and accessible by API 160 for communication to the financial institution server 200 via communications module 170. The game console identifier 180 may be communicated as plaintext or, in certain embodiments, the game console identifier 180 may be encrypted or otherwise encoded prior to communication to prevent the identifier from being intercepted during communication.

In addition, the financial institution service application 140 can deliver user interfaces for the financial institution service that are unique to the gaming platform. The user interfaces may provide for the user/customer to conduct transactions and the like using input mechanisms that are unique to the gaming console platform. For example, the game pad provides for multiple action buttons as opposed to the two buttons configured on a conventional mouse input device for a PC. In addition, the user interface may rely on motion detection in the game controller for inputs to the user interface, or other user inputs related to special purpose controllers or the like. In this regard, the overall user experience with the financial institution service is enhanced by providing more interactivity and the like than would be provided by a conventional PC platform.

According to one optional embodiment of the present invention, the memory 120 may include a user authentication module 142 that is operable to provide user authentication prior to granting the user authorization to access services, such as financial institution services or the like. The user authentication module 142 may include a gaming console-specific user authentication routine 144 that is operable to provide for user authentication based on pre-determined user designated inputs to input mechanisms 190 that are specific to gaming consoles.

For example, certain game controllers include an accelerometer or other mechanisms for detecting motion in the game controller device. As such, the user may designate a certain predetermined game controller motion passcode 146 for purposes of authentication. The motion input corresponds to a plurality of vectors, for example three-dimensional vectors representing x, y and z coordinates, and a vector representing time. Once the motion input is received, the vectors may be converted to a numeric value, encrypted into a password and, optionally, hashed, prior to communicating the password to a network entity for authentication purposes. Such motions would characteristically be harder to intercept or replicate and would be easier for the user to remember than conventional alpha-numeric passwords.

In another example, the input mechanism 190 may be a conventional gamepad, also referred to in the art as a joypad. The gamepad can have anywhere from two input buttons/keypads up to a dozen or more, combined with multiple omnidirectional analogue or digital control sticks. In such input devices, the user may designate a predetermined controller input passcode 148, which may be a series or pattern of multiple inputs to the various buttons, control sticks and the like configured on the gamepad. As noted above, such gamepad inputs would less likely be susceptible to eavesdropping, replication or the like and would be easier for the user to remember.

In another example, the input mechanism 190 may be a special purpose game controller, such as a dance pad or other mechanism that provides for inputs based on feet movement to designated areas on the pad. In such input mechanisms, the user designated predetermined controller input passcode 148 may include a series or pattern of multiple inputs to the various areas on the pad (e.g., a dance step or routine). In another example, the input mechanism may be any other special purpose input device, such as a steering wheel or a light gun, and the user designated predetermined controller input passcode 148 may be a series or pattern of one or more inputs to the specific special purpose input device. According to one embodiment of the invention, user authentication routine 144 may be configured to store and accept a different user input/action for each input mechanism, such that the user can provide the predetermined input/motion to the device, depending upon which device or devices are currently connected to the gaming console device 100.

In another example, such as when the gaming console device 100 is a portable device, the input mechanism 190 may be a touch-screen or the like and the user designated predetermined controller input passcode 148 may be a series or pattern of various inputs to the touch screen display, such as movement of objects on the display or a series/pattern of taps to the display.

In accordance with further embodiments of the present invention, the financial institution service application 140 may include a voice chat module 192 and/or a text chat module 194, which are operable to provide for bi-directional voice streams and/or text streams between the user of the financial institution service and a representative for the financial institution during an ongoing secure financial institution service.

Activation by the user of the voice chat module 192 provides for a secured connection, such as a SSL or TLS connection, to be established between the gaming console device 100 and a network entity/server associated with the financial institution for the purpose of securely transporting the voice stream. Additionally, upon activation, the voice chat module 192 accesses and gains control over the gaming device's microphone and speaker capabilities to provide input and output mechanisms for the voice stream.

Activation of the text chat module 194 also provides for a secured connection, such as a SSL or TLS connection, to be established between the gaming console device 100 and a network entity/server associated with the financial institution for the purpose of securely transporting the text stream. Additionally, upon activation, the text chat module 194 accesses and gains control over the gaming device's keypad and display capabilities to provide input and output mechanisms for the text stream.

In alternate embodiments, the voice chat module 192 and/or the text chat module 194 may be included within the memory of the game console device 100, therefore obviating the need to include such within the financial institution service application 140. In such embodiments, the financial institution service application 140 may include modules, routines or the like (not shown in FIG. 2) that allow the financial institution service application 140 to interface with the voice chat and/or text chat capabilities of the gaming console device 100.

Both the voice chat module 192 and the text chat module 194 include a secure connection set-up routine 196 and 198, respectively. The secure connection set-up routine provides for a secure connection to be established as the communication channel for the voice stream or text stream. Examples of secure connections include, but are not limited to, Secure Socket Layer (SSL) protocol and Transport Layer Security (TLS) protocol. The secure connection provides for the voice or text stream to be encrypted via the SSL connection, TLS connection or the like prior to communication to the network entity associated with the financial institution to ensure that the data streams are not intercepted by a would-be attacker.

The flow diagrams of FIGS. 7 and 8 are discussed infra and provide further details in regards to those embodiments of the present invention related to voice chat and/or text chat.

Referring to FIG. 3, a flow diagram is presented of a method 300 for providing financial institution services on a gaming console, in accordance with an embodiment of the present invention. At Event 310, a financial institution service application is loaded onto a game console device. The financial institution service application may be obtained from the financial institution in a tangible form, such as Compact Disc (CD) or the like, loaded onto the gaming console by inserting the CD in a portable media drive and saving the application in gaming console memory. Alternatively, the financial institution application may be downloaded from a financial institution networked site, such as a public website or the like and stored on gaming console memory. As previously mentioned, the financial institution service application 140 may be associated with any financial institution such as a commercial bank, brokerage firm, lending firm or the like. The financial institution service application 140 provides for establishing a secured network connection to the associated financial institution for delivery of financial institution services. The financial institution services may include, but are not limited to, online banking, point-of-sale services, inter account transfers, investment services, account balance services, loan services, payment services and the like.

At Event 320, the financial institution service application 140 is launched on the gaming console. Launching of the financial institution service application 140 may be based on user input to an input mechanism, such as a game controller or the like, or the financial institution service application 140 may be configured to be launched at the boot-up/power-up of the gaming console device 100.

At Event 330, the financial institution service application 140 establishes a secure connection with the financial institution using bi-directional digital certificate exchange between the application and a financial institution server 200 and game console identification. One example of messaging flow for bi-directional digital certificate exchange is shown and described in relation to FIG. 4, infra. In addition to digital certificate exchange for the purpose of verifying both the application at the financial institution server and the financial institution server 200 at the application, the gaming console device 100 may be configured to communicate a hardware identifier to the financial institution server 200 for the purpose of verifying the gaming console device 100 at the financial institution server 200.

At Event 340, once the secure network connection has been established, the user is authenticated as a means of authorizing the user to use the financial institution services. User authentication provides for the user to provide authentication credentials, generally in the form of a password or pass code, which are securely validated by the financial institution. According to one embodiment of the present invention, the user authentication credentials may be defined by gaming console-specific user inputs, such as a predetermined motion provided to a motion-detecting game controller or other predetermined inputs provided to a joypad or any other special purpose game controller. The flow diagram of FIG. 5 is discussed infra and provides further details in regards to those embodiments of the present invention related to game console-specific user authentication. At Event 350, based on the authentication process, the user receives confirmation of the validation of the user authorization and is thereby permitted to conduct transactions, access information and the like associated with the financial institution services.

At Event 360, the user conducts financial transactions or otherwise accesses information provided by the financial institution service. In one example, conducting financial transactions or accessing information may occur based on manual inputs provided by a user, such as a consumer banking user or the like. In another example, conducting financial transactions may be based on inputs from accessories/devices/applications, which are in communication with the gaming console device 100. The accessories may include, but are not limited to, a card scanner, a cash drawer, a UPC scanner or the like. In this regard, the business user can use the gaming console as a point-of-sale terminal enabling cash services via the gaming console device and/or back-end financial transactions conducted by the financial institution via the secure session established between the application and financial institution server(s).

Turning the reader's attention to FIG. 4, a messaging diagram 400 is provided that specifies the messages exchanged during SSL or TLS protocol handshake, according to an embodiment of the present invention. The SSL or TLS protocol handshake provides for bi-directional exchange of digital certificates, such that the financial institution application is able to verify the financial institution and the financial institution is able to verify the application.

At Event 402, the financial institution service application initiates the secure connection by communicating a session identifier to the financial institution server, the session identifier also serves as a digital certificate request. Additionally, the session identifier message may include the highest SSL or TLS version number supported by the application and a preferential listing of supported cryptography and compression schemes.

At Event 404, the server examines the session identifier and determines if the session identifier remains in the server's cache. If it is determined that the session identifier is in the cache, the server will attempt to re-establish a previous session with the application. If the session identifier is not recognized in the cache, the server will continue the handshake process to establish the secure session. At Event 406, assuming the secure session needs to be established, a session identifier acknowledgement is sent to the financial institution service application. The acknowledgement repeats the session identifier, optionally indicates the SSL/TLS version to be used for this connection and specifies which encryption method and compression scheme to use for this session.

At Event 408, the server communicates the server's signed digital certificate to the financial institution. The digital certificate may also include the server's public key. At optional Event 410, the server communicates a server key, which is a premaster secret, in those instances in which the digital certificate (Event 408) does not include enough data for this purpose. The premaster secret is used in some, but not all key exchange schemes and therefore may not be applicable.

At Event 412, the server sends a digital certificate request to the financial institution service application 140 for the purpose of authenticating the application at the server. At Event 414, the server communicates a server handshake complete message indicating that the server's portion of the key exchange handshake is complete.

At Event 416, in response to the application receiving the server handshake complete message, the application communicates the application's signed public key certificate to the server. In addition, at Event 418, the server may communicate the client secret key that is to be used with the secret key cryptography scheme. At Event 420, the application communicates the certificate verification message to the server that provides explicit verification of the application's certification.

The TLS protocol includes the change cipher spec protocol to indicate the changes in the encryption method. Thus, at Event 422, a change cipher spec message is communicated from the application to the server, which is encrypted and compressed using the current (as opposed to the new) encryption and compression schemes. At Event 424, the server returns in kind a change cipher spec message to notify the application that all following information will employ the newly negotiated cipher spec and keys. At Event 426, a finished message is sent from the server to the application to confirm that the key exchange and authentication process were successful. At this point, both the application and the server can exchange application data using the session encryption and compression schemes.

Referring to FIG. 5, a flow diagram is depicted of a method 500 for authenticating a user of a game console-based application using game console-specific user inputs as the authentication mechanisms/passcodes, in accordance with an embodiment of the present invention. At Event 502, game console-specific user authentication inputs are inputted into the application that is executed on the game console. As previously noted, the game console-user authentication inputs may be any predetermined inputs associated with a gaming console input device, such as a game controller.

In one example, the game console-specific authentication inputs may be a pattern or a series of user inputs applied to the input keys of a game pad. FIG. 6A provides an illustration of a game pad 600 having numerous input mechanisms, such as input keys or buttons 602, combined with multiple omnidirectional analogue or digital control sticks 604. In the illustrated example, the action buttons 602A, 602B, 602C and 602D are depicted to the right, and the directional keys 604E, 604F, 604G, and 604H are depicted to the left. The center buttons 602I, 602J and 602K may provide for other functions. In the context of user authentication, any series or pattern of inputs to the buttons 602 or the control sticks 604 may define a user's predetermined authentication mechanism/passcode.

In another example, the game console-specific authentication inputs may be a motion or motions that a user applies to a game controller capable of detecting motion. FIG. 6B provides an illustration of a game pad 600 having numerous input mechanisms, such as buttons 602A-602K and including an internal motion detector 610 operable for detecting motion in the game pad 600. In one embodiment in which the game pad 600 includes both input buttons 602 and an internal motion detector 610, the user authentication mechanism/passcode may include a predetermined motion to the game controller and one or more inputs, for example a pattern, to the one or more buttons or other input mechanisms on the face of the game pad 600.

In other examples, user inputs to special purpose input mechanisms may define the user's authentication mechanism/passcode. For example, foot inputs to a dance pad controller, shooting inputs to a light gun controller, or movements/turns to a steering wheel controller may define the user's authentication mechanism. In another example, in which the gaming console is configured with a touch screen display, such as in instances in which the gaming console is a portable device, inputs to the touch screen display may define a user's authentication mechanism/passcode.

At Event 504, the input data that defines the user's authentication mechanism is converted to a numeric value. In those embodiments in which the input data is a motion, the input data may include multiple vectors, such as space dimensional vectors defining the x, y and z axis, as well as a vector that defines a time dimension. Other vectors related to the motion detection input or any other authentication mechanism input are also possible. At Event 506, an encryption routine is applied to the numeric value to create a password. The encryption routine may be a secret/private key encryption routine, such as a block cipher routine, implementing an XOR function or a more detailed secret key encryption algorithm, such as Data Encryption Standard (DES), Triple-DES (3DES), DESX, Advanced Encryption Standard (AES), CAST-128, CAST-256, International Data Encryption Algorithm (IDEA), Rivest Ciphers 1-6 (RC1-RC-6), Blowfish, Twofish, Camellia, MISTY1, Secure And Fast Encryption Routine (SAFER), KASUMI, SEED, Skipjack or any other suitable private key encryption routine. Additionally, a public key encryption routine may be used to encrypt the numeric value in the authentication process. The public key encryption routine may be, but is not limited to, RSA, Diffie-Hellman, Digital Signature Algorithm (DSA), ElGamel, Elliptical Curve Crptography (ECC), Public-Key Crytography Standards (PKCS), Cramer-Shoup, Key Exchange Algorithm (KEA), LUC or the like.

At optional Event 508, the encrypted password may be hashed prior to communication to a network entity to provide for further security. The hash function may be applied to ensure that the password is not intercepted during communication and serves as a digital fingerprint to ensure that the password has not been altered by an intruder or virus.

At Event 510, the password or hashed password is communicated to the network entity for user authentication and, based on the results of the authentication process performed at the network entity at Event 512, a user verification is received by the application authorizing the user to use the service.

Referring to FIG. 7, a flow diagram is provided depicting a method 700 for secure text chat sessions during delivery of financial institution services on a game console platform, according to an embodiment of the present invention. At Event 710, a financial institution service application is loaded onto a game console. The financial institution service application may be obtained from the financial institution in a tangible form, such as Compact Disc (CD) or the like, and loaded onto the gaming console or the financial institution application may be downloaded from a financial institution networked site, such as a website or the like and stored on gaming console memory. At Event 720, the financial institution service application is launched on the gaming console. Launching of the financial institution service application may be based on user input to an input mechanism, such as a game controller or the like, or the financial institution service application may be configured to be launched at the boot-up/power-on of the gaming console device.

At Event 730, the user of the financial institution service requests an online text chat session for the financial institution service. The request prompts, at Event 740, the establishment of a secure connection between the financial institution service application/gaming console and a network entity, such as a server or the like, associated with the financial institution. In one embodiment of the present invention, the secure connection may be an SSL protocol connection, a TLS protocol connection or any other suitable secure network connection. In addition, the request for the online text session prompts, at Event 750, the application to request access to and control of the keyboard and display associated with the gaming console for the purpose of inputting and outputting text messages.

At Event 760, once the secure network connection has been established and the application gains control/access of the keyboard and display, text inputs are received by the user of the application. At Event 770, the text streams are tunneled through the secure network connection to the network entity associated with the financial institution. According to one embodiment, the text streams may be encrypted and/or hashed prior to tunneling the text streams through the SSL connection. In response to the text stream being communicated to the financial institution network entity, at Event 780, the application may receive a text stream from the network entity associated with the financial institution through the established secure network connection. In those embodiments of the invention in which the received text stream is encrypted, a decryption process may be employed once the text stream is received. Once received and optionally decrypted, the text scream is displayed on the display associated with the gaming console.

At Event 790, the text stream session is disconnected based on user input or user inactivity. The disconnection of the text session prompts the tear-down of the secure network connection and the release of the keyboard and display.

Referring to FIG. 8, a flow diagram is provided depicting a method 800 for secure text chat sessions during delivery of financial institution services on a game console platform, according to an embodiment of the present invention. At Event 810, a financial institution service application is loaded onto a game console. The financial institution service application may be obtained from the financial institution in a tangible form, such as Compact Disc (CD) or the like, and loaded onto the gaming console or the financial institution application may be downloaded from a financial institution networked site, such as a website or the like and stored on gaming console memory. At Event 820, the financial institution service application is launched on the gaming console. Launching of the financial institution service application may be based on user input to an input mechanism, such as a game controller or the like, or the financial institution service application may be configured to be launched at the boot-up/power-on of the gaming console device.

At Event 830, the user of the financial institution service requests an online text chat session for the financial institution service. The request prompts, at Event 840, the establishment of a secure connection between the financial institution service application/gaming console and a network entity, such as a server or the like, associated with the financial institution. In one embodiment of the present invention, the secure connection may be an SSL protocol connection, a TLS protocol connection or any other suitable secure network connection. In addition, the request for the online text session prompts, at Event 850, the application to request access to and control of the microphone and speaker associated with the gaming console for the purpose of inputting and outputting text messages.

At Event 860, once the secure network connection has been established and the application gains control/access of the microphone and speaker, voice inputs are received by the user of the application. At Event 870, the voice streams are tunneled through the secure network connection to the network entity associated with the financial institution. According to one embodiment, the voice streams may be encrypted and/or hashed prior to tunneling the voice streams through the SSL connection. In response to the voice stream being communicated to the financial institution network entity, at Event 880, the application may receive a voice stream from the network entity associated with the financial institution through the established secure network connection. In those embodiments of the invention in which the received voice stream is encrypted, a decryption process may be employed once the voice stream is received. Once received and optionally decrypted, the voice stream is displayed on the display associated with the gaming console.

At Event 890, the voice stream session is disconnected based on user input or user inactivity. The disconnection of the voice session prompts the tear-down of the secure network connection and the release of the keyboard and display.

FIG. 9 provides a block diagram overview of the architecture of a generic game console device 100, in accordance with an embodiment of the present invention. It should be noted that the architecture herein described is by way of example only and that other gaming console architectures currently available, or available in the future may be used in conjunction with the present embodiments without departing from the inventive concepts herein disclosed. The game console device 100 includes a circuit board or other module 900 for housing the various components of the game console device 100. Included within the circuit board/module 900 are a central processing unit (CPU) 120 and a memory controller 902 that facilitates processor access to various types of memory, including a flash ROM (Read Only Memory) 904, and a RAM (Random Access Memory) 906, disposed on the circuit board/module 900. In addition, the memory controller 902 facilitates memory access to a hard disk drive 908, and the portable media drive 910 through ATA (Advanced Technology Attachment) cable 912. As shown in FIG. 9, the financial institution service application 140 of present embodiments may be stored in the flash ROM memory 904 and may be loaded into memory from the portable media drive 910.

The CPU 120 may be equipped with a level 1 cache 914 and a level 2 cache 916 to temporarily store data and hence, reduce the number of memory access cycles, thereby improving processing speed and throughput.

The CPU 120, memory controller 902, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

As previously noted in one suitable implementation, the CPU 120, memory controller 902, ROM 904, and RAM 906 are integrated onto a common circuit board/module 900. In this implementation, ROM 904 is configured as a flash ROM that is connected to the memory controller 902 via a PCI (Peripheral Component Interconnect) bus and a ROM bus (neither of which are shown in FIG. 9). RAM 906 is configured as multiple DDR SDRAM (Double Data Rate Synchronous Dynamic RAM) that is independently controlled by the memory controller 902 via separate buses (not shown in FIG. 9).

A 3D graphics processing unit 920 and a video encoder 922 form a video processing pipeline for high speed and high resolution graphics processing. Data is carried from the graphics processing unit 920 to the video encoder 922 via a digital video bus (not shown in FIG. 9). An audio processing unit 924 and an audio codec (coder/decoder) 926 form a corresponding audio processing pipeline with high fidelity and stereo processing. Audio data is carried between the audio processing unit 924 and the audio codec 926 via a communication link (not shown). The video and audio processing pipelines output data to an A/V (audio/video) port 928 for transmission to the television or other display. In the illustrated implementation, the video and audio processing components 920-928 are mounted on the circuit board/module 900.

Also implemented on the circuit board/module 900 are a USB host controller 930 and a network interface 932. The USB host controller 930 is coupled to the CPU 120 and the memory controller 902 via a bus (e.g., a PCI bus) and serves as host for the peripheral controllers 934A, 934B. The network interface 932 provides access to one or more networks (e.g., Internet, home network, etc.) and may be any of a wide variety of various wire or wireless interface components, including an Ethernet card, a modem, a Bluetooth module, a cable modem, and the like.

The game console device 100 has a dual controller port subassembly 936 and that supports two game controllers 934A and 934B. Alternate game console architectures may provide for more than one dual controller support subassembly. A front panel I/O subassembly 938 supports the functionality of the power button 940, the eject button 942, other I/O mechanisms 944, as well as any LEDs (Light Emitting Diodes) or other indicators exposed on the outer surface of the game console. The subassemblies 936 and 938 are coupled to the circuit board/module 900 via one or more cable assemblies 946.

A system power supply module 948 provides power to the components of the game console device 100. A cooling system 950 cools the circuitry within the game console device 100.

A console user interface (UI) application 952 is stored on the hard disk drive 908. When the game console is powered on, various portions of the console UI application 952 are loaded into RAM 906 and/or caches 914, 916 and executed on the CPU 120. The console UI application 952 presents a graphical user interface that provides a consistent user experience when navigating to different media types available on the game console device 100.

In accordance with present embodiments in which the game console device 100 is a secure device that executes signed code only, the game console device 100 implements a cryptography engine to perform common cryptographic functions, such as encryption, decryption, authentication, digital signing, hashing, and the like. The cryptography engine may be implemented as part of the CPU 120, or in software stored on the hard disk drive 908 that executes on the CPU 120, so that the CPU 120 is configured to perform the requisite cryptographic functions.

The game console device 100 may be operated as a stand-alone system by simply connecting the system to a television or other display. In this stand-alone mode, the game console device 100 allows one or more players to play games, watch movies, or listen to music. However, with the integration of broadband connectivity made available through the network interface 932, the game console device 100 may further be operated as a participant in a larger network gaming community and/or be connected to other networked entities.

Thus, present embodiments provide for methods, systems, and computer program products that provide for financial institution services to be delivered via a gaming console platform. The gaming console platform is characteristically limited to executing signed code and is therefore a much more secure device than a conventional PC. Additionally, the gaming console platform allows for the financial institution service application to be tailored to the capabilities and functionality of the gaming console, thereby providing the user with a heightened experience not afforded by convention platforms. Additional embodiments of the present invention provide for a user authentication method that implements gaming console-specific user inputs as the authentication mechanism/passcode. In this regard, input devices that are specific to gaming consoles, such as gamepads, motion detecting game controllers and the like may be used to provide for user inputs that define the authentication mechanism/passcode. Such authentication mechanisms are more difficult to replicate and/or intercept than conventional alpha-numeric passcodes and are more readily remembered by the user. Another embodiment of the present invention provides for text chat sessions and/or voice chat sessions to be employed in conjunction with game console-based financial institution services. The text chat and or voice chat sessions that are provided implement a secure network connection and provided for greater overall security than would be afforded text or voice chat sessions on a conventional platform.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing voice chats for a game console-based online financial institution service, the method comprising:

executing, on a game console device, an online financial institution service application; receiving, at the game console device, a user request to initiate a voice chat session via the online financial institution service;

establishing one of a Secured Socket Layer (SSL) protocol tunneled network connection or a Transport Layer Security (TLS) protocol tunneled network connection between the game console device and a network entity associated with the financial institution, wherein the network connection is established by communicating a game console identifier from the game console device to the network entity and bi-directional exchange of digital certificates between the game console device and the network entity;

accessing and controlling a voice input mechanism associated with the gaming console and a voice output mechanism associated with the game console based on receipt of the user request;

receiving, at the voice input mechanism, user voice inputs for the voice chat session encrypting and hashing, at the game console device, the user voice inputs; and communicating the user voice inputs via one of the SSL protocol tunneled network connection or the TLS protocol tunneled network connection to the network entity associated with the financial institution.

2. The method of claim 1, wherein executing an online financial institution service application further comprises executing the online financial institution service application that includes signed code.

3. The method of claim 1, wherein the game console device is further defined as being configured to execute only signed code.

4. The method of claim 1, further comprising receiving, at the game console device, financial institution voice data communicated from the network entity and outputting the financial institution voice data at the voice output mechanism.

5. The method of claim 1, wherein communicating the user voice inputs further comprises communicating the user voice inputs via one of the SSL protocol tunneled network connection or the TLS protocol tunneled network connection using Voice Over IP (VOIP) to the network entity associated with the financial institution.

6. A system for providing voice chats for a game console-based online financial institution service, the system comprising:

a gaming console device including a computing platform having a processor and a memory in communication with the processor; and an online financial customer service application operable to be loaded into the memory of the gaming console device and executed on the gaming console device, wherein the application is specifically configured for the gaming console device and includes:

voice chat computer instructions executable by the processor and configured to:
receive a user input to initiate a voice chat session, establish one of a Secured Socket Layer (SSL) protocol tunneled network connection or a Transport Layer Security (TLS) protocol tunneled network connection between the gaming console device and a network entity associated with the financial institution, wherein the network connection is established by communicating of a game console identifier from the gaming console device to the network entity and bi-directional exchanging of digital certificates between the gaming console device and the network entity, access and control a voice input mechanism associated with the gaming console device and a voice output mechanism associated with the gaming console device, receive, at the voice input mechanism, user inputs for the voice chat session, encrypt and hash the user voice inputs, and communicate the user voice inputs via one of the SSL protocol tunneled network connection or the TLS protocol tunneled network connection to the network entity.

7. The system of claim 6, wherein the online financial customer service application further comprises signed code.

8. The system of claim 7, wherein the gaming console device is further defined as configured to execute only signed code.

9. The system of claim 6, wherein the voice chat computer instructions are further operable to send and receive voice chat streams via one of the SSL protocol tunneled network connection or the TLS protocol tunneled network connection using Voice Over IP (VOIP).

10. A computer program product, comprising:
a non-transitory computer-readable medium comprising game console executable instructions configured to perform a method of:
executing an online financial institution service application;
receiving a user request to initiate a voice chat session via the online financial institution service;
establishing one of a Secured Socket Layer (SSL) protocol tunneled network connection or a Transport Layer Security (TLS) protocol tunneled network connection between a game console device and a network entity associated with the financial institution, wherein the network connection is established by communicating a game console identifier from the game console device to the network entity and bi-directional exchanging of digital certificates between the game console device and the network entity;
accessing and controlling, on behalf of the voice chat session, a voice input mechanism associated with the gaming console device and a voice output mechanism associated with the game console device based on receipt of the user request;
receiving, at the voice input mechanism, user voice inputs for the voice chat session encrypting and hashing the user voice inputs; and communicating the user voice inputs via one of the SSL protocol tunneled network connection or the TLS protocol tunneled network connection to a network entity associated with the financial institution.

11. The computer program product of claim 10, comprising the non-transitory computer-readable medium comprising the game console executable instructions configured to further perform executing the online financial institution service application that includes signed code.

12. The computer program product of claim 10, comprising the non-transitory computer-readable medium comprising the game console executable instructions configured to further perform executing the online financial service application on the game console device that is configured to execute only signed code.

13. The computer program product of claim 10, comprising the non-transitory computer-readable medium comprising the game console executable instructions configured to further perform receiving, at the voice output mechanism, financial institution voice inputs for the voice chat session.

14. The computer program product of claim 10, comprising the non-transitory computer-readable medium comprising the game console executable instructions configured to further perform communicating the user voice inputs via one of the SSL protocol tunneled secure network connection or the TLS protocol tunneled network connection using Voice Over IP (VOIP) to the network entity associated with the financial institution.

* * * * *